United States Patent [19]

Clements

[11] Patent Number: 5,010,913
[45] Date of Patent: Apr. 30, 1991

[54] FLUID BLEED APPARATUS

[75] Inventor: Martin A. Clements, Cincinnati, Ohio

[73] Assignee: General Electric Co., Cincinnati, Ohio

[21] Appl. No.: 463,073

[22] Filed: Jan. 10, 1990

[51] Int. Cl.⁵ ............................................. F16K 31/44
[52] U.S. Cl. ..................... 137/322; 251/229; 251/347; 251/348; 251/354
[58] Field of Search .......... 137/320, 321, 322; 251/318, 322, 323, 149.4, 149.5, 149.6, 229, 349, 348, 354; 222/400.7

[56] References Cited

U.S. PATENT DOCUMENTS

| | | | |
|---|---|---|---|
| 2,283,970 | 5/1942 | Buttner | 137/322 |
| 2,842,382 | 7/1958 | Franck | 251/149.4 |
| 3,095,899 | 7/1963 | Billington | 137/454.5 |
| 3,353,724 | 11/1967 | Johnston | 137/322 |
| 3,441,046 | 4/1969 | Cranage | 137/329.1 |
| 3,592,439 | 7/1971 | Ritchie, Jr. | 251/149.4 |
| 3,618,644 | 11/1971 | Grise | 141/348 |
| 4,063,708 | 12/1977 | Smith | 251/149.4 |
| 4,069,686 | 1/1978 | Hoelman | 137/322 |
| 4,186,910 | 2/1980 | Higami | 251/149.6 |
| 4,193,419 | 3/1980 | Pellerito | 137/322 |
| 4,331,175 | 5/1982 | Brake et al. | 251/149.5 |
| 4,393,844 | 7/1988 | Skinner | 123/450 |
| 4,476,892 | 10/1984 | Boyce | 137/322 |
| 4,510,969 | 4/1985 | Rodth | 137/322 |
| 4,706,636 | 11/1987 | Davis | 123/557 |

FOREIGN PATENT DOCUMENTS 1105615 3/1968 United Kingdom .............. 137/322

Primary Examiner—George L. Walton
Attorney, Agent, or Firm—Jerome C. Squillaro

[57] ABSTRACT

An apparatus for bleeding or purging fluid from a fluid line includes a bleed valve permanently affixed to the wall of the fluid line and a valve actuator releasably connected to the bleed valve which is operative to move a spring-biased, one-way valve member in the bleed valve between a valve open and valve closed position. The valve actuator is movable to a valve open position relative to the one-way valve member in response to the spring force exerted by a coil spring or the like, which avoids damage to the biasing spring associated with the one-way valve member. The valve actuator also includes a guard to prevent assembly or disassembly of the valve actuator and bleed valve with the valve actuator in a valve open position.

12 Claims, 1 Drawing Sheet

FLUID BLEED APPARATUS

The government has rights in this invention pursuant to Contract No. F33657-81-C-0073 awarded by the Department of Air Force.

FIELD OF THE INVENTION

This invention relates to apparatus for bleeding or purging fluid from a fluid line, and, more particularly, to the combination of a bleed valve affixed to a fluid line and a valve actuator removably coupled to the bleed valve for opening the valve to bleed or purge fluid from the fluid line.

BACKGROUND OF THE INVENTION

Apparatus for purging or bleeding fluid lines, particularly those intended for use in jet aircraft, generally include a bleed valve permanently attached to the fluid line and a separate valve actuator releasably connected to the bleed valve which is operative, in a valve open position, to open the valve and purge or bleed fluid from the line. After the bleed or purge operation is completed, the valve actuator is removed and the bleed valve remains with the fluid line.

One common deficiency of bleed apparatus of the type described above is that no safety mechanism is provided to prevent engagement or disengagement of the valve actuator and bleed valve when the valve actuator is in the valve open position. If the valve actuator is in a valve open position upon connecting or removing it from the bleed valve, leakage of fluid from the fluid line is virtually certain to occur. This can be particularly dangerous where caustic or other hazardous fluid is being transmitted by the fluid line.

Another problem with bleed or purge apparatus such as described above involves inadvertent damage to the valve member of the bleed valve. Most bleed valves of the type utilized in a bleed/purge application include a one-way valve member such as a ball which is spring-biased against a seat to place the valve in a closed position. The valve actuator is moved to the valve open position to disengage this ball from the seat to open the valve. In many bleed apparatus designs, the valve actuator can be tightened down into a valve open position with such force as to damage the spring or other means used to bias the valve member of the bleed valve into a normally closed position. After a period of time, the spring or other biasing means can be weakened to a point where it fails to return the ball to a seated, closed position and thus permits leakage of the fluid from the valve.

A still further limitation of many apparatus for bleeding or purging fluid from a fluid line is the size and weight of the bleed valve portion of the apparatus. This is of particular concern in applications such as the fluid lines in jet aircraft wherein the bleed valves must be as small and lightweight as possible. Because the bleed valve is permanently attached to the fluid line, the bulky or heavy bleed valves of many prior art apparatus cannot be utilized in applications such as in jet aircraft.

SUMMARY OF THE INVENTION

It is therefore among the objectives of this invention to provide a fluid bleed apparatus which prevents inadvertent bleeding or purging of fluid from a fluid line, which protects the bleed valve from damage and which is useful in applications wherein size and weight are an important design factor.

These objectives are accomplished in a fluid bleed apparatus which includes a small, lightweight bleed valve fixedly mounted over an opening in the wall of a fluid line, and a valve actuator removably coupled to the bleed valve. The bleed valve includes a poppet, or other one-way valve member, which is moved to an open position by the valve actuator. The valve actuator includes structure to avoid connecting or disconnecting the valve actuator to the bleed valve with the valve actuator in a valve open position, and structure to control the force with which the poppet of the bleed valve is opened and closed.

In the presently preferred embodiment, the bleed valve includes a valve body formed with a fluid passageway having an inlet at one end and an outlet at the opposite end. The valve body is welded, brazed or otherwise fixedly attached over an opening formed in the wall of the fluid line such that the inlet of the fluid passageway in the valve body communicates with the interior of the fluid line. A poppet or other one-way valve member is mounted on a spring within the passageway of the valve body, and this spring normally biases the poppet to a closed position against a seat formed in the fluid passageway. The poppet is movable between this closed position against the seat, and an open position in which the poppet disengages the seat and permits flow of fluid from the fluid line, into the inlet of the fluid passageway and then through bores in the poppet to the outlet of the fluid passageway.

The bleed valve is releasably coupled to the valve actuator by a cap which threads onto the exterior surface of the bleed valve and forces a ferrule mounted at the base of the valve actuator into sealing engagement with the body of the bleed valve. The valve actuator includes a plunger guide attached to the ferrule which slidably receives a plunger having an actuator tip and an internal cavity. The plunger is axially movable with respect to the plunger guide between a valve closed position in which the actuator tip of the plunger is spaced from the bleed valve, and a valve open position in which the actuator tip engages the poppet of the bleed valve and forces the poppet to disengage its seat. With the plunger in the valve open position, a fluid flow path is formed from the opening in the wall of the fluid line, into the fluid passageway of the bleed valve and then through the internal cavity of the plunger to a fluid collector.

One important aspect of this invention is to control the force with which the actuator tip of the plunger engages the poppet of the bleed valve so that the spring which biases the poppet to a normally closed position does not become damaged. The structure of the valve actuator which protects the poppet spring from damage includes an outer collar having threads which engage mating threads on the outer surface of the plunger guide, and an actuator spring which extends between a spacer ring carried by the outer collar and a bearing surface formed on the plunger. In response to axial movement of the outer collar with respect to the plunger guide, the actuator spring forces the plunger and its actuator tip in a direction toward the poppet of the bleed valve. The force applied by the actuator spring to the plunger in the course of moving the actuator tip into engagement with the poppet is limited by the size and compression force of the actuator spring. Preferably, the actuator spring is chosen such that sufficient force is provided to disengage the poppet from its seat without damaging the poppet spring which biases the poppet to a closed position. The poppet spring is thus protected from damage which could result from overtightening or over-extension of the actuator tip of the plunger.

Another important feature of this invention is the provision of structure to prevent disengagement of the valve actuator and bleed valve during a fluid purging or bleeding operation, and to prevent engagement of the valve actuator and bleed valve if the plunger of the valve actuator is in a valve open position. In the presently preferred embodiment, the outer collar of the valve actuator is formed with an annular extension which, with the outer collar and plunger in a valve open position, extends downwardly to a lowermost position below the base of the plunger guide. In this valve open position, the annular extension of the outer collar blocks access to the cap which interconnects the valve actuator to the bleed valve. As a result, the valve actuator and bleed valve cannot be interconnected with the valve actuator in a valve open position.

In order to tighten down the cap to interconnect the valve actuator and bleed valve, the outer collar and plunger must be located in the valve closed position, i.e., with the outer collar and plunger located at an uppermost position along the plunger guide. Once the cap is tightened down, the plunger can be moved to the valve open position wherein the outer collar and plunger are axially moved to a lowermost position along the plunger guide. In this valve open position, the annular extension prevents disengagement of the valve actuator from the bleed valve because the annular extension of the outer collar is moved into a position below the base of the plunger guide and covers the cap. With access to the cap blocked by the annular extension, the valve actuator and bleed valve must remain in an assembled position until such time as the outer collar of the valve actuator is returned to its uppermost location along the plunger guide, i.e., to the valve closed position.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figures 1, 2:
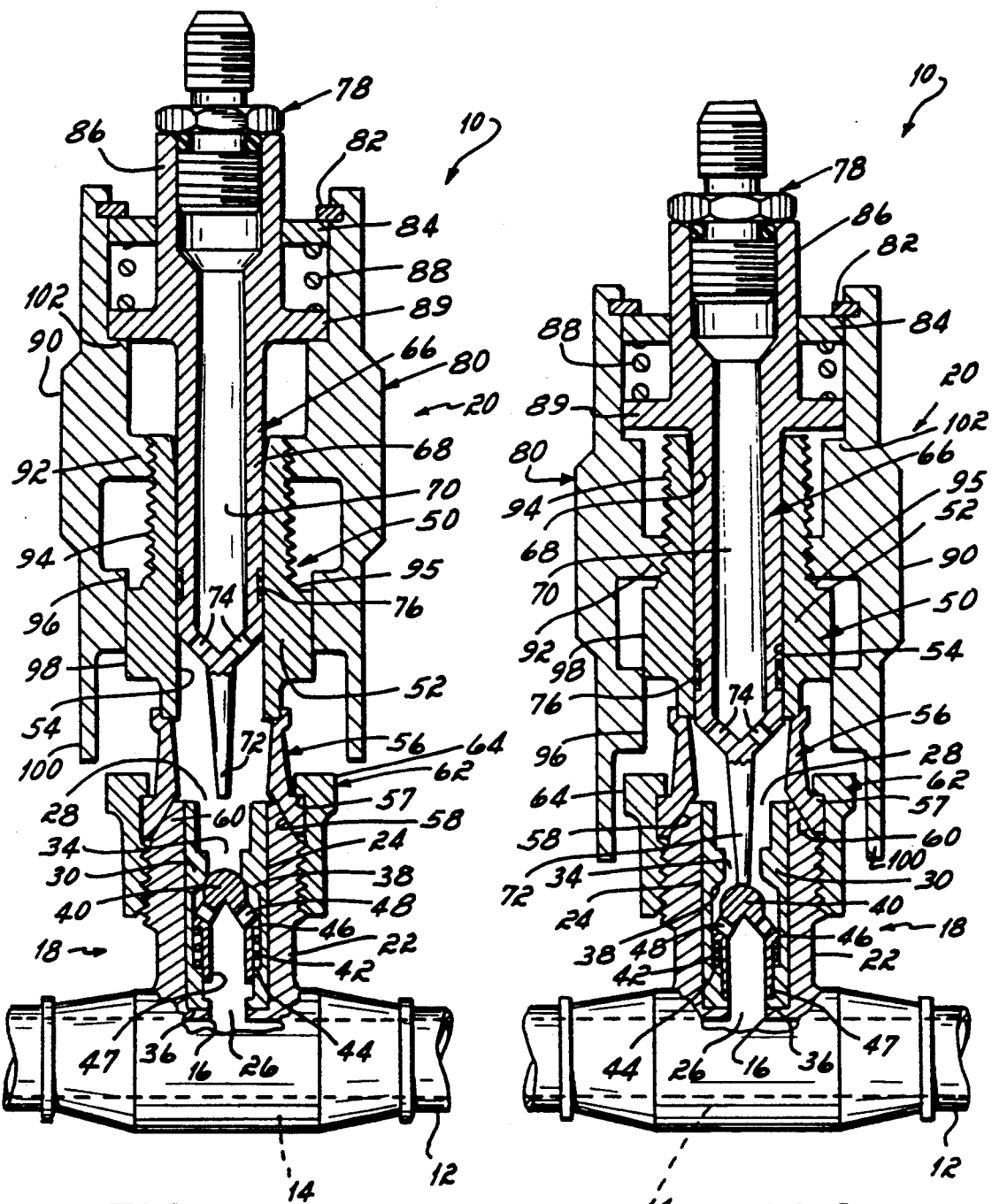
FIG. 1 is a cross sectional view of the fluid bleed apparatus of this invention with the valve actuator in a valve closed position.
FIG. 2 is a view similar to FIG. 1 with the valve actuator in a valve open position.

Referring now to the Figs., a fluid bleed apparatus 10 is shown in an assembled position with respect to a fluid line 12 having a wall 14 formed with an opening 16. It is contemplated that the fluid line 12 could be of essentially any type and carry a variety of fluids, including gases, liquified gases, liquids, etc.

The fluid bleed apparatus 10 comprises a bleed valve 18 connected to a valve actuator 20. The bleed valve 18 comprises a valve body 22 formed with a throughbore 24 having an inlet 26 and an outlet 28. The valve body 22 is welded, brazed or otherwise permanently affixed to the wall 14 of fluid line 12 over its opening 16 such that the inlet 26 of throughbore 24 communicates with the interior of the fluid line 12. As described below, the valve actuator 20 is removably mounted to the bleed valve 18 to bleed or purge fluid from the fluid line 12 as desired.

The throughbore 24 of valve body 22 carries an insert 30 having an internal wall which defines a fluid passageway 34. The base of the insert 30 rests upon a shoulder 36 formed at the base of the valve body 22 so that the fluid passageway 34 of the insert 30 communicates with the inlet 26 of the valve body 22. The internal wall of insert 30 is formed with a valve seat 38 which is adapted to sealingly engage a one-way valve member such as a poppet 40. The poppet 40 is normally urged against the seat 38 by a spring 42 which extends between a shoulder 44 formed in the wall of insert 30 and an annular flange 46 formed in the poppet 40. The poppet 40 is also preferably formed with an annular skirt 47 which confines the spring 42 between the shoulder 44 and flange 46, and against the wall of insert 30. As described in more detail below, the poppet 40 is movable between a closed position against the seat 38 as illustrated in FIG. 1, and an open position spaced from the seat 38 as illustrated in FIG. 2. In the open position, a fluid flow path is formed between the interior of the fluid line 12, the fluid passageway 34 in insert 30 and bores 48 formed in the poppet 40 which direct the fluid past the valve seat 38.

The poppet 40 is moved between an open and closed position by the valve actuator 20. The valve actuator 20 includes a plunger guide 50 having a generally cylindrical-shaped wall 52 formed with a throughbore 54. The bottom end of wall 52 is fixedly connected to a ferrule 56 having an annular, tapered base 58. The tapered base 58 of ferrule 56 is shaped to mate with the tapered upper end 60 of the valve body 22. A cap 62 is provided having a head 64 which rests upon a flange 57 on the ferrule 56. This flange 56 is captured between the head 64 and internal threads formed on the cap 62 which mate with external threads on the outer surface of valve body 22. The cap 62 is thus carried on the ferrule 56 and is effective to clamp the tapered base 58 of ferrule 56 against the upper end 60 of valve body 22, which, in turn, releasably interconnects the bleed valve 18 with the valve actuator 20.

The throughbore 54 of plunger guide 50 slidably receives a plunger 66. The plunger 66 is formed with a generally cylindrical-shaped wall 68 having an internal cavity 70, and an actuator tip 72 connected to the bottom of wall 68. The bottom of the wall 68 of plunger 66 is also formed with inlet bores 74 which permit the flow of fluid from the bleed valve 18 into the internal cavity 70 of the plunger 66. O-rings 76 are preferably carried on the outer surface of the plunger wall 68 to create a seal between the plunger 66 and plunger guide 50. As shown in FIG. 1, a fitting 78 is mounted at the top of the internal cavity 70 of plunger 66 for connection to a fluid collection line (not shown).

The outer portion of the valve actuator 20 is formed by an outer collar 80. The top portion of the outer collar 80 carries a retainer 82 which mounts a donut-shaped spacer ring 84. The spacer ring 84 is slidable along the cylindrical-shaped top end 86 of the plunger 66. An actuator spring 88 is interposed between this spacer ring 84 and a flange 89 integrally formed in the wall 68 of plunger 66.

The outer surface of the outer collar 80 is formed with flats 90 to permit rotation of the outer collar 80 with respect to the plunger guide 50, using a wrench or other tool (not shown). The outer collar 80 is formed with an inner ring 92 having internal threads which mate with external threads 94 formed on the exterior surface of the wall 52 of plunger guide 50. The outer collar 80 is also formed with an annular, inner bearing surface 96 which slidably engages an outer bearing surface 98 formed on the wall 52 of plunger guide 50. Additionally, the base of outer collar 80 is formed with an annular extension 100, for purposes to become apparent below.

The operation of the fluid bleed apparatus 10 of this invention is as follows. In the valve closed position of bleed apparatus 10, the poppet 40 of bleed valve 18 is biased by the poppet spring 42 against the valve seat 38. This prevents the passage of fluid from the fluid line 12 through the poppet 40 to the internal cavity 70 of plunger 66. See FIG. 1.

In order to move the poppet 40 of bleed valve 18 to an open position as shown in FIG. 2, a wrench or other tool is placed on the flats 90 formed on the outer collar 80 of valve actuator 20 and the outer collar 80 is rotated with respect to the plunger guide 50. The threaded connection between the inner ring 92 of outer collar 80 and the external threads 94 on the plunger guide 50 results in downward, axial movement of the outer collar 80 with respect to the plunger guide 50. In the course of such downward axial movement, the inner bearing surface 96 of outer collar 80 slides along the outer bearing surface 98 of plunger guide 50 and the annular extension 100 of the outer collar 80 moves into a position surrounding the cap 62.

In response to the downward axial movement of outer collar 80, the actuator spring 88 interposed between the spacer ring 84 connected to the outer collar 80 and the flange 89 of plunger 66 forces the plunger 66 downwardly along the throughbore 54 in plunger guide 50. Downward axial movement of the outer collar 80 is continued until the plunger 66 reaches a valve open position, i.e., wherein its inner ring 92 engages a shoulder 95 formed on the wall 52 of plunger guide 50 and its actuator tip 72 forces the poppet 40 from the valve seat 38. In this valve open position shown in FIG. 2, a flow path is created which extends from the fluid line 12, through the bores 48 in poppet 40 into the fluid passageway 34 of insert 30, and then through the ferrule 56, through the inlet bores 74 into the internal cavity 70 of the plunger 66.

One important aspect of this invention is that essentially the sole force acting on the plunger 66 to move the poppet 40 to the valve open position is created by the spring force exerted against the plunger 66 by the actuator spring 88. While the outer collar 80 is axially threaded along the plunger guide 50, the actuator spring 88 is carried axially downwardly with the movement of outer collar 80 and exerts a controlled, limited downward force on the plunger 66. This protects against overstressing of the poppet spring 42 which normally biases the poppet 40 to a closed position against the seat 38. The bleed valve 18 is returned to the valve closed position by reversing the direction of rotation of the outer collar 80 so that a shoulder 102 in the wall of the outer collar 80 engages the flange 89 of plunger 66 and thus moves the plunger 66 in an upward axial direction with the outer collar 80. This allows the poppet spring 42 to return the poppet 40 into a closed position against the seat 38.

Another important aspect of this invention is the protection afforded by the annular extension 100 of the outer collar 80 against leakage of fluid through the bleed valve 18. As shown in FIG. 2, with the plunger 66 in a valve open position, the annular extension 100 extends below the base of the plunger guide 50 and ferrule 56. This prevents assembly of the valve actuator 20 onto the bleed valve 18 with the plunger 56 in a valve open position because access to the cap 62 would be blocked by the annular extension 100 if an attempt was made to place the valve actuator 20 atop the bleed valve 18. As a result, the plunger 66 must first be placed in the valve closed position shown in FIG. 1 to permit assembly of the valve actuator 20 and bleed valve 18.

Disassembly of the valve actuator 20 and bleed valve 18 is also prevented with the plunger 66 in the valve open position. As shown in FIG. 2, the annular extension 100 of outer collar 80 substantially covers the head 64 of cap 62 in the valve open position. This prevents unthreading of the cap 62, and, therefore, disengagement of the valve actuator 20 from the bleed valve 18 with the actuator tip 72 of the plunger 66 in the extended, valve open position.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. Apparatus for bleeding fluid from a fluid line, comprising:
   a bleed valve adapted to mount to the wall of a fluid line over an opening therein, said bleed valve having a seat and a valve member, said valve member being movable with respect to said seat between an open position spaced from said seat to permit the passage of fluid from the fluid line through said bleed valve and a closed position against said seat to prevent the passage of fluid therethrough;
   biasing means for urging said valve member to said closed position against said seat;
   a valve actuator coupled to said bleed valve, said valve actuator including:
   (i) a plunger slidably disposed within said actuator and engageable with said valve member;
   (ii) force limiting means for exerting a limiting controlled force between said actuator and said plunger so that said valve member is moved from said closed position to said open position without damaging said biasing means associated with said valve member;
   (iii) means for receiving fluid from said bleed valve with said valve member in said open position.

2. The apparatus of claim 1 in which said means for exerting a limiting controlled force on said plunger includes:
   a plunger guide mounted to said bleed valve, said plunger guide having a wall formed with a bore along which said plunger is axially slidable;
   a collar axially movable with respect to said plunger guide;

means interposed between said collar and said plunger for exerting a force on said plunger in response to axial movement of said collar along said plunger guide, said force being effective to cause said plunger to move said valve member to said open position without damaging said biasing means associated with said valve member.

3. The apparatus of claim 2 in which said means interposed between said collar and said plunger is a spring.

4. A valve actuator for use with a one-way valve connected to a fluid line to bleed or purge fluid from the fluid line, the one-way valve having a valve member urged by a biasing spring from an open position to a closed position, said valve actuator comprising:
   a plunger adapted to engage the valve member of the one-way valve;
   a plunger guide adapted to be mounted to the one-way valve, said plunger guide slideably receiving said plunger;
   an outer collar axially movable with respect to said plunger guide;
   force limiting means interposed between said outer collar and said plunger for exerting a limiting force on said plunger in response to axial movement of said outer collar relative to said plunger guide, said force being effective to cause said plunger to move the valve member of the one-way valve to the open position without damaging the biasing spring associated with the valve member of the one-way valve.

5. The valve actuator of claim 4 in which said force limiting means interposed between said collar and said plunger is a spring.

6. Apparatus for bleeding fluid from a fluid line, comprising:
   a bleed valve adapted to mount to the wall of a fluid line over an opening therein, said bleed valve having a seat and a valve member movable between an open position and a closed position with respect to said seat;
   biasing means for biasing said valve member to said closed position against said seat;
   a valve actuator having a plunger slidably disposed within said actuator and engageable with said valve member, and having force limiting means for exerting a controlled limiting force between said actuator and said plunger to move said plunger to a valve open position, said plunger being effective in said valve open position to move said valve member of said bleed valve to said open position;
   connector means for releasably connecting said valve actuator to said bleed valve;
   guard means carried by said valve actuator for preventing access to said connector means with said valve actuator in said valve open position.

7. The apparatus of claim 6 in which said force limiting means for exerting a force on said plunger includes:
   a plunger guide mounted to said bleed valve, said plunger guide having a wall formed with a bore along which said plunger is axially slidable;
   a collar axially movable with respect to said plunger guide;
   axial force limiting means interposed between said collar and said plunger for exerting a force on said plunger in response to said axial movement of said collar along said plunger guide, said force being effective to cause said plunger to move said valve member to said open position without damaging said biasing means associated with said valve member.

8. The apparatus of claim 7 in which said connector means comprises:
   a ferrule fixedly mounted to said plunger guide and engageable with said bleed valve;
   a cap carried by said ferrule and having internal threads which mate with external threads formed on said bleed valve, said cap being effective to releasably secure said ferrule on said plunger guide to said bleed valve.

9. The apparatus of claim 8 in which said guard means comprises an annular extension mounted to said collar, said annular extension being axially movable with said collar so that upon movement of said plunger to said valve open position, said annular extension substantially covers said cap.

10. The apparatus of claim 7 in which said wall of said plunger guide is formed with external threads, said collar having an inner flange formed with threads engageable with said external threads of said plunger guide and an outer surface formed with flats, whereby rotation of said collar using said flats produces axial movement of said collar along said plunger guide.

11. The apparatus of claim 7 in which said axial force limiting means interposed between said collar and said plunger is a spring.

12. The apparatus of claim 11 in which said collar mounts a ring slidable along said plunger, and said plunger guide is formed with a flange, said spring being connected between said ring and said flange.

* * * * *